United States Patent [19]
Ramel

[11] Patent Number: 5,864,577
[45] Date of Patent: *Jan. 26, 1999

[54] METHOD, TRANSMITTER AND RECEIVER FOR THE TRANSMISSION OF INFORMATION IN PACKETS HAVING A HEADER AND SUBPACKETS

[75] Inventor: Louis Ramel, Auneau, France

[73] Assignee: Thomson-CSF, Paris, France

[*] Notice: This patent issued on a continued prosecution application filed under 37 CFR 1.53(d), and is subject to the twenty year patent term provisions of 35 U.S.C. 154(a)(2).

[21] Appl. No.: 491,252

[22] Filed: Jun. 16, 1995

[30] Foreign Application Priority Data

Jun. 24, 1994 [FR] France ................... 94 07792

[51] Int. Cl.$^6$ .............. H04B 1/38; H04K 1/00
[52] U.S. Cl. ........................... 375/200; 375/202
[58] Field of Search .................... 375/202, 220, 375/377; 235/472, 375; 455/89, 33.1

[56] References Cited

U.S. PATENT DOCUMENTS 5,022,046  6/1991  Morrow, Jr. .
5,227,614  7/1993  Danielson et al. ............. 235/380

FOREIGN PATENT DOCUMENTS 0 486 834 A1  5/1992  European Pat. Off. .
WO 94/10774   5/1994  WIPO .

OTHER PUBLICATIONS

IEEE International Symposium on Spread Spectrum Techniques and Applications, Sep. 24–26, 1990; London, GB; pp. 47–52; I. Vajda, 'On Random Code–Hopping DS/SSMA System'.

*Primary Examiner*—Chi H. Pham
*Assistant Examiner*—William Luther
*Attorney, Agent, or Firm*—Oblon, Spivak, McClelland, Maier & Neustadt, P.C.

[57] ABSTRACT

The disclosure relates to the transmission of information by packets on carrier frequencies, with data spreading and compression, between several transmitters and at least one receiver of one and the same communications network. In the network, the packets are constituted by a header followed by sub-packets transmitted in synchronism with the header and with a given periodicity, and this synchronism and this periodicity are the same for all the packets. Furthermore, all the sub-packets have the same structure as a standard sub-packet formed by mutually orthogonal segments. With such packets, the risks of overlapping are notably smaller than they were with standard packets. Application to the transmission of packets.

5 Claims, 3 Drawing Sheets

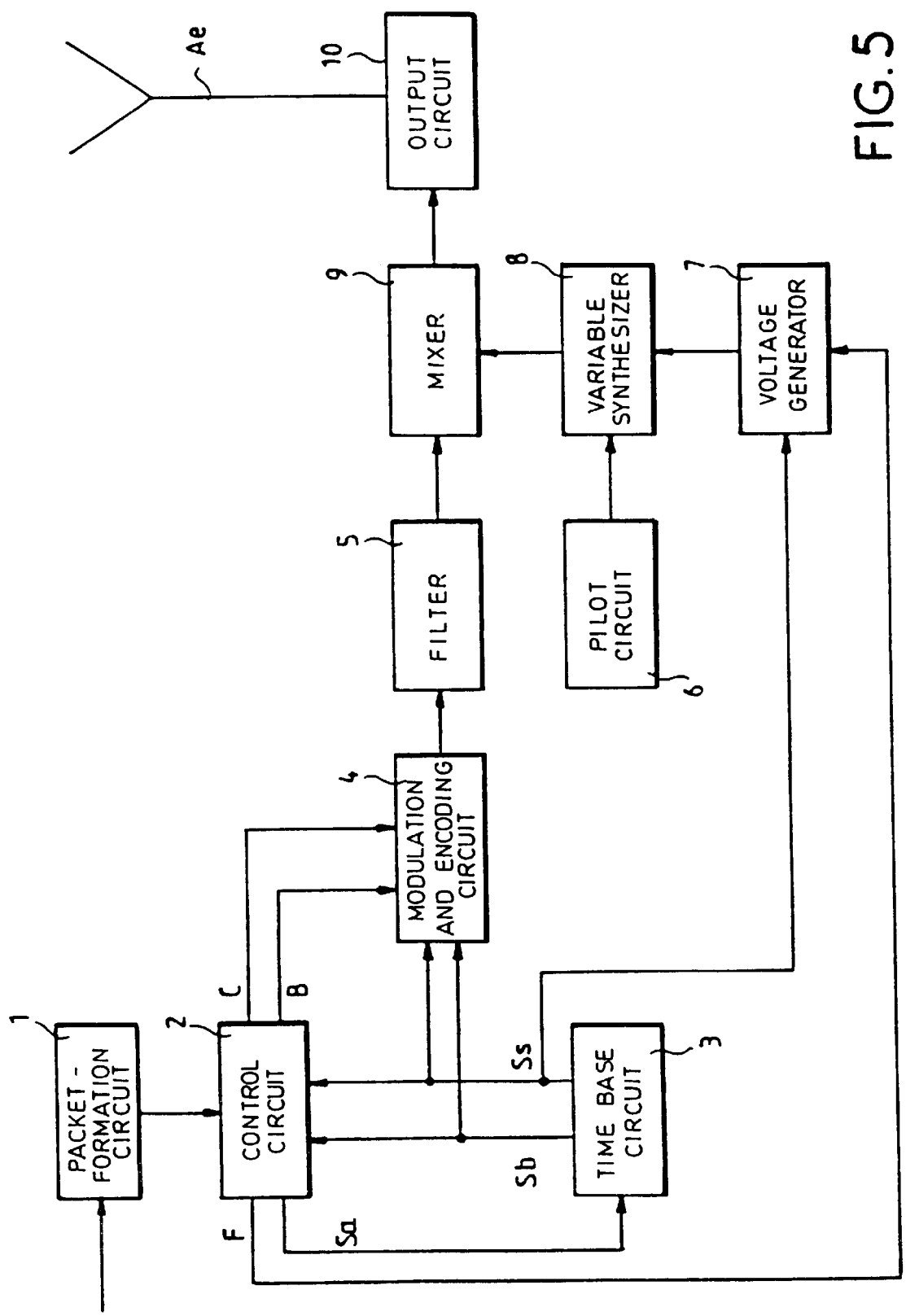

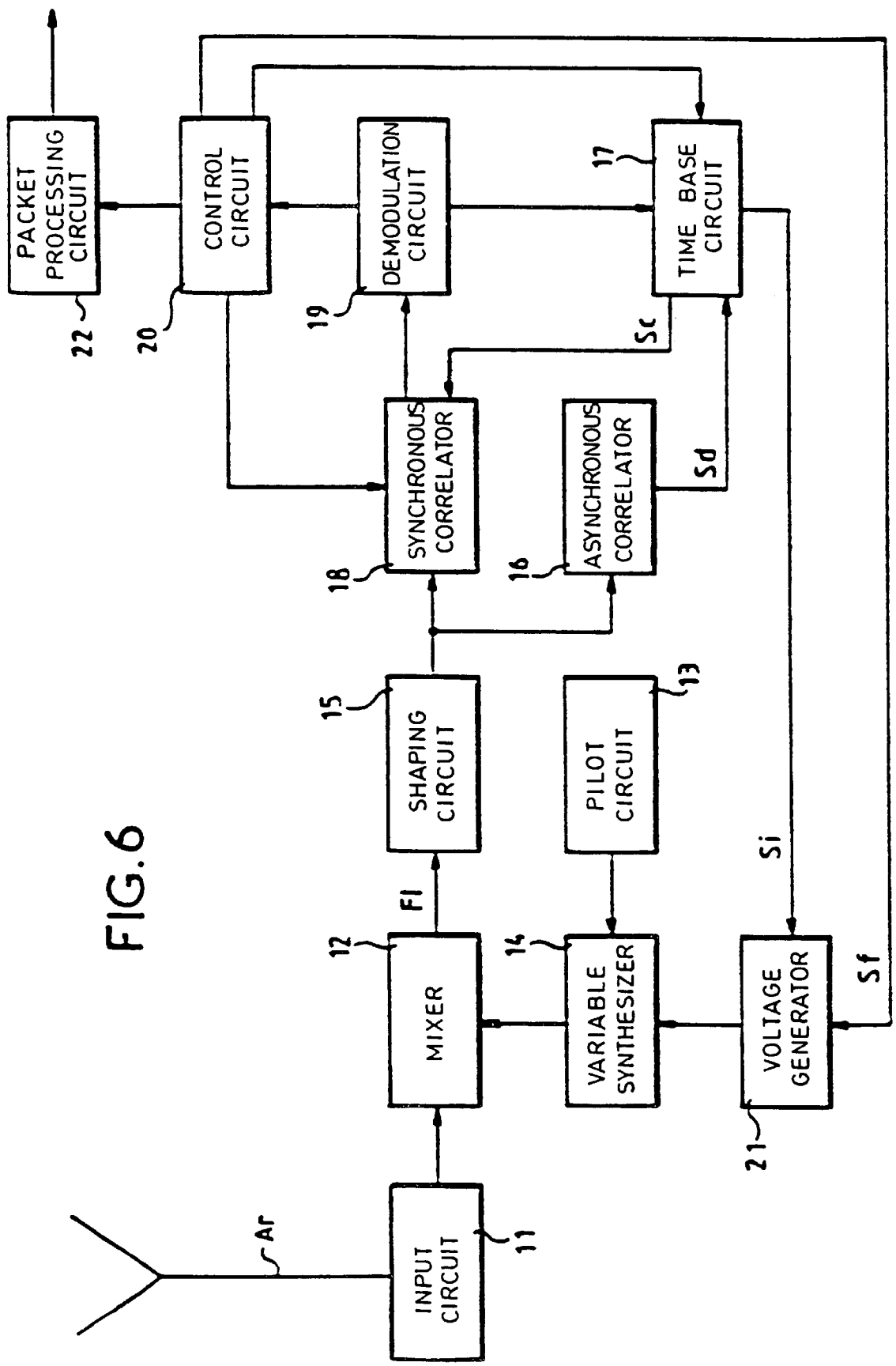

METHOD, TRANSMITTER AND RECEIVER FOR THE TRANSMISSION OF INFORMATION IN PACKETS HAVING A HEADER AND SUBPACKETS

BACKGROUND OF THE INVENTION

CROSS-REFERENCE TO RELATED APPLICATION

This application contains subject matter that is related to that disclosed in U.S. application Ser. No. 08/352,029, filed Nov. 30, 1994 now abandoned.

FIELD OF THE INVENTION

The present invention relates to the transmission of information by packets on carrier frequencies, with data spreading and compression (namely the operation in reverse to the spreading by which the data is restored to its original form), between several transmitters and at least one receiver of one and the same communications network.

DESCRIPTION OF THE RELATED ART

When several transmitters have to transmit packets towards one or more receivers either by RF links or by the use of wired links, at least some of which may convey packets that do not come from a single transmitter, there is a risk of overlapping. This is the risk of having two packets which, at least for a part of their respective periods, reach a receiver simultaneously and then cannot be separated from each other because they have similar characteristics. Such overlapping, which is more or less total, is generally called a collision or interference between packets.

To reduce the risks of collision, different techniques are known. These consist in making the packets orthogonal with one another, i.e. in giving them characteristics at transmission that are sufficiently different from one transmitter to another to make it possible for the packets to be separated at reception. Thus, there is a known way of making all the different transmitters transmit at different carrier frequencies. This technique is called frequency division multiple access or FDMA. Its implementation is not always possible for reasons of available frequency bandwidth, and even for reasons of cost price of the receivers. There also is a known way of sending packets according to spreading codes that are different from one transmitter to another. This technique is called code division multiple access or CDMA. Another way of reducing the risks of collision is to carry out transmission on a time division basis with the different transmitters. This technique is called time division multiple access or TDMA. It requires that the transmitters and the receiver or receivers must all work in synchronism and is therefore not easy to use. These three techniques may furthermore be combined to make the packets mutually orthogonal.

Prior to reception from several transmitters, a receiver must know the characteristics, known as the spread characteristics, proper to each of the transmitters, namely the characteristics that correspond to the carrier frequencies and to the codes used in each transmitter and to the time intervals allocated to each transmitter. The result thereof is that to have efficient orthogonality between the packets and a high packet transmission rate, the protocols of implementation, both at transmission and at reception of the packets, are complex.

SUMMARY OF THE INVENTION

The present invention is aimed at preventing or at least at reducing the above-mentioned drawbacks.

This is obtained in particular by using packets with a particular configuration.

According to the present invention, there is provided a method for the transmission of data by packets, on carrier frequency, with spreading and compression of the data, between several transmitters and at least one receiver, that consists in transmitting packets constituted by a header at a predetermined frequency, followed by n sub-packets where n is a real number greater than 1 and is a function of the packet considered, all the sub-packets having the same structure as a predetermined standard sub-packet formed by mutually orthogonal segments, then consists in transmitting the sub-packets of a packet in synchronism with the transmission of the header of the packet and with a periodicity at least equal to the duration of the standard sub-packet and then consists, at reception, in having in memory the structure of the standard sub-packet, identifying the packets in monitoring only the reception of the headers, the sub-packets packets of a packet identified by its header being then processed as a function of the structure of the standard sub-packet to compress its data elements.

According to the present invention, there is further provided a transmitter for the implementation of a method for the transmission of data by packets, on carrier frequency, with spreading and compression of the data, between several transmitters and at least one receiver, that consists in transmitting packets constituted by a header at a predetermined frequency, followed by n sub-packets where n is a real number greater than 1 and is a function of the packet considered, all the sub-packets having the same structure as a predetermined standard sub-packet formed by mutually orthogonal segments, then consists in transmitting the sub-packets of a packet in synchronism with the transmission of the header of the packet and with a periodicity at least equal to the duration of the standard sub-packet and then consists, at reception, in having in memory the structure of the standard sub-packet, identifying the packets in monitoring only the reception of the headers, the sub-packets packets of a packet identified by its header being then processed as a function of the structure of the standard sub-packet to compress its data elements, this transmitter comprising control means having, in memory, the frequency transmission of the header, the frequency of repetition of the sub-packets and the spread characteristics of the standard sub-packet in order to activate the preparation of the spread characteristics of any packet to be transmitted.

According to the present invention, there is further provided a receiver for the implementation of a method for the transmission of data by packets, on carrier frequency, with spreading and compression of the data, between several transmitters and at least one receiver, that consists in transmitting packets constituted by a header at a predetermined frequency, followed by n sub-packets where n is a real number greater than 1 and is a function of the packet considered, all the sub-packets having the same structure as a predetermined standard sub-packet formed by mutually orthogonal segments, then consists in transmitting the sub-packets of a packet in synchronism with the transmission of the header of the packet and with a periodicity at least equal to the duration of the standard sub-packet and then consists, at reception, in having in memory the structure of the standard sub-packet, identifying the packets in monitoring only the reception of the headers, the sub-packets of a packet identified by its header being then processed as a function of the structure of the standard sub-packet to compress its data elements, this receiver comprising monitoring means to identify the headers and activate the process of compressing a packet received when the header of this received packet is identified, and control means having, in memory, the frequency of repetition of the sub-packets and the spread characteristics of the standard packet in order to activate the compression of any received packet as a function of the spread characteristics of the standard sub-packet.

BRIEF DESCRIPTION OF THE DRAWINGS

The present invention will be understood more clearly and other characteristics shall appear from the following description and from the figures pertaining thereto, of which.

DETAILED DESCRIPTION OF THE PREFERRED INVENTION

Figure 1:
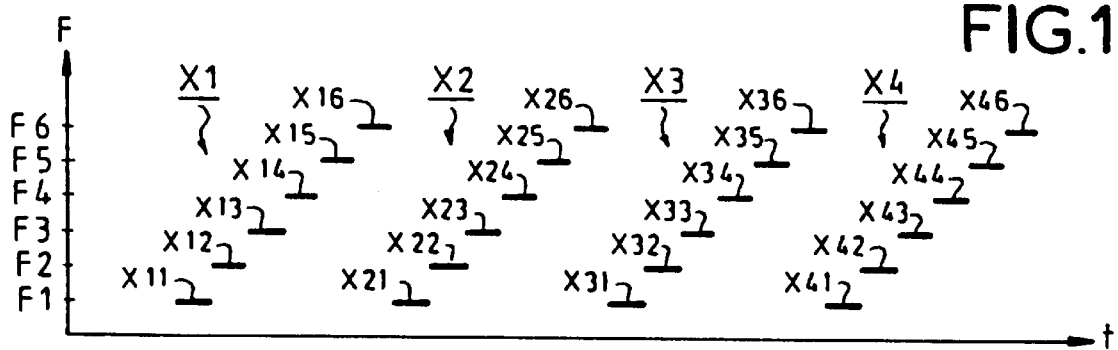
FIGS. 1 to 4 are diagrams designed to illustrate transmissions of packets by the method according to the invention, FIGS. 5 to 6 respectively show the drawings of a transmitter and a receiver for the implementation of a method according to the invention.

In the description and in the claims, a certain number of terms are used, the meaning of which is recalled here below. Certain of these definitions shall be taken up further below, at least partially, when it is deemed that they are necessary in order to facilitate the understanding of the invention.

The term "header" refers to a sequence of bits all sent on one and the same carrier frequency known to all the transmitters and receivers of the network and, in certain applications, this frequency may vary with time. Among the bits of a header, the first bits have a function of synchronization and the following ones enable the management of the information exchanges.

The term standard sub-packet herein represents a sequence of data bits having a fixed length, a fixed transmission bit rate, hence a fixed duration and furthermore having a given relationship of spreading. According to this relationship, the bits of the standard sub-packet are distributed in successive segments, preferably all of the same duration, each having their own spread characteristics. The spread characteristics of two segments, whatever they may be, are mutually orthogonal, namely there would be no collision between these segments if they were transmitted at the same instant respectively by two transmitters of the network. It must be noted that, in addition to its own characteristics, the header has the same characteristics as the segments of the sub-packets and that, preferably, the duration of the header and of the segments of the sub-packet are the same.

According to the method, the packets are each formed by a header followed by a number n, where n is a real number greater than 1, of sub-packets transmitted in synchronism with the header of the packet and at intervals of a constant duration. Furthermore, the fields of synchronization formed by the headers all have the same constitution and all the sub-packets transmitted in the network have the same constitution as a predetermined standard packet. Thus, with the carrier frequency of the header of every packet transmitted being known, whatever the transmitter station, a receiver station will identify the arrival of a packet in having to monitor only the arrival of the headers. When such an identification takes place, it is enough for the receiver station to get synchronized in a standard way with the identified header in order to take account of the spread characteristics of the sub-packets and adapt its reception characteristics to these spread characteristics in order to successively receive all the sub-packets constituting the packet. Of course, the risks of collision remain but they are notably reduced with respect to what they were with standard methods. Indeed, there is no collision with a packet if there is no collision with the header or with the first sub-packet as shall be shown hereinafter. By a preliminary listening to every packet transmission, it is possible to prevent the header or the first sub-packet of a new packet from coming into collision respectively with a header and a sub-packet in the course of being transmitted. In this way, there will be no collision, on the totality of the new packet, with the packets already being transmitted when the header of the new packet starts being transmitted. However, this preliminary listening operation is costly, especially because of the listening and control means that it requires.

From the foregoing, it can be seen that the risks of collision for one and the same quantity of information exchanged will become smaller with an increase in the length, i.e. a decrease in the number, of the packets for transmitting this information, the corollary of this being that this packets will each include more sub-packets.

Some examples of sub-packets as defined are described with reference to FIGS. 1 to 4 which are diagrams showing the spreading of sub-packets as a function of time.

Figure 2:
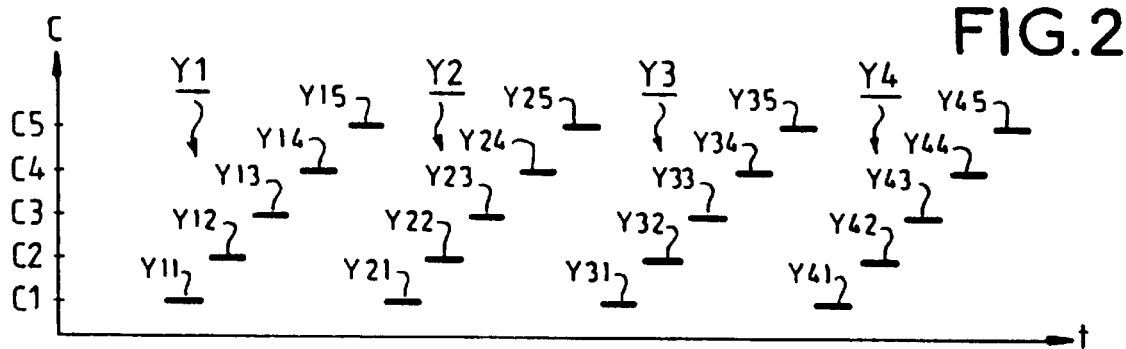
Figure 3:
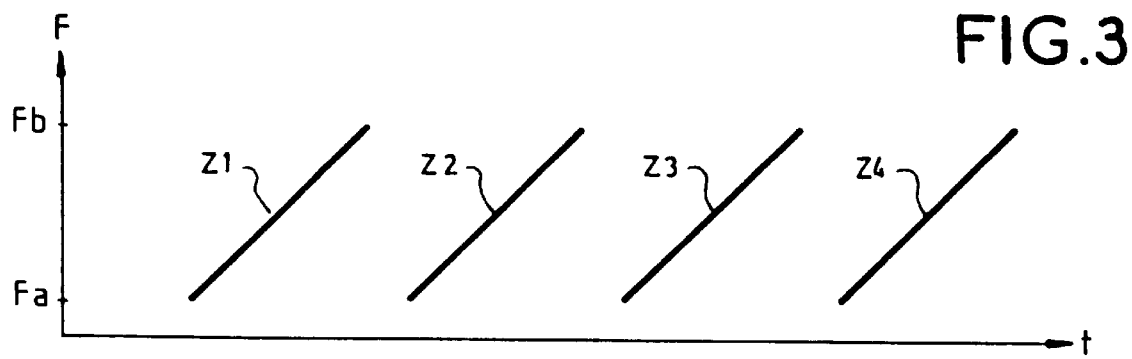

FIGS. 1 to 3 each show a succession of four sub-packets: X1 to X4 for FIG. 1, Y1 to Y4 for FIG. 2, Z1 to Z4 for FIG. 3. In each case, the four sub-packets are constituted on the model of a standard sub-packet constituted by a sequence of data elements having a fixed length, a fixed transmission bit rate and hence a fixed duration. Furthermore, a given relationship of spreading is applied to the standard sub-packet. Again, in all three cases represented, the sub-packets are sent out at fixed frequency and while of course the period of transmission of the packets cannot be smaller than the duration of a sub-packet, hence that of the standard sub-packet, it may be greater than it.

In the case of FIG. 1, the relationship of spreading is of the frequency hopping type. It consists in dividing the sub-packet into six segments such as X11 to X16 for the sub-packet X1 and in transmitting the six segments respectively in six different frequencies F1 to F6.

In the case of FIG. 2, the relationship of spreading is of the encoding type. It consists in dividing the sub-packet into five segments such as Y11 to Y15 for the sub-packet Y1 and in sending the data contained in the five segments by encoding them respectively according to five mutually orthogonal codes, C1 to C5.

In the case of FIG. 3, the relationship of spreading is of the frequency gradient type. It consists in transmitting the data elements contained in a sub-packet on a carrier frequency varying from the value Fa to the value Fb in a given time. In this case, it may be considered that the sub-packet itself is also formed by segments but these are segments reduced to only one bit.

Other types of sub-packets may be used, for example by associating a spreading code with each of the frequency levels of the standard sub-packet which is used as a model for the sub-packets according to FIG. 1. The codes will be chosen as to be mutually orthogonal, at least for two successive segments, whichever they may be, of the standard sub-packet.

It must be noted that, when two transmitters of a network transmit sub-packets having one and the same configuration, for example according to one of the FIGS. 1 to 3, there will be no collision between their sub-packets unless there is partial or total overlapping between the segments of the sub-packets have the same spread characteristics.

Figure 4:
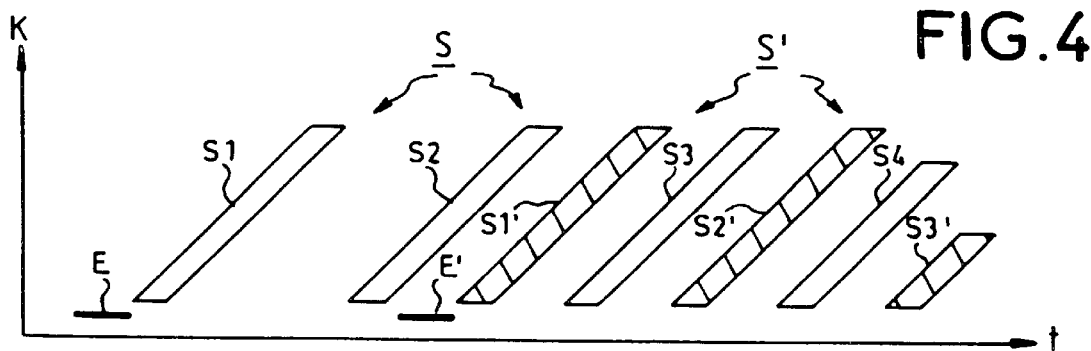

FIG. 4 shows how to constitute packets S, S' out of the sub-packets according to FIGS. 1, 2, 3. The method may be implemented with any relationship of spreading, K, for example one of the relationships described by means of FIGS. 1 to 3 or a combination of these relationships. In FIG. 4, the sub-packets are represented by parallelograms. For the following explanations, it is necessary only to recall that the sub-packets are formed by segments and that to each segment there corresponds a set of spread characteristics and that the spread characteristics of two segments of one and the same sub-packet are mutually orthogonal.

The packet S has a header E followed by sub-packets S1 to S4. It must be noted that the last sub-packet S4 has a duration smaller than that of the others. This is due to the fact that, in the case considered, the set of data elements to be transmitted requires only a whole number of sub-packets. In the case of the packet S, the number of sub-packets is 3.8. As for the packet S', it too has a header E' followed by 2.4 sub-packets S1' to S3'.

All the sub-packets S1 to S4 and S1' to S3' have the same structure as a predetermined standard sub-packet and follow each other with the same periodicity within the packets. Under these conditions, and since the headers are all transmitted at one and the same frequency and are not orthogonal to one another, if there is to be no collision between the two packets S, S' transmitted by two transmitters of a communications network, it is enough that there is not even a partial overlapping between the header E' of the second packet S' and the header E of the first packet and that the first sub-packet S1' of the second packet S' is not in collision with a sub-packet, whichever it may be, of the first packet. This amounts to saying that if neither the header nor the first sub-packet come into collision, the two packets cannot collide whatever may be their respective lengths, at least inasmuch as the frequencies of transmission of the sub-packets remain perfectly identical in both transmitters from which the two packets considered are transmitted.

In associating, as indicated here above, reception means with each transmitter in order to monitor the transmissions of headers and of sub-packets in the network, it is possible to achieve total avoidance of inter-packet collision by seeking the time intervals available for this purpose. However, this is a costly improvement. Since the technique of preliminary listening is a known technique and does not contribute anything to an understanding of the method according to the invention, it shall no longer be referred to hereinafter.

The exemplary embodiments of a transmitter and a receiver that shall be described with reference to FIGS. 5 and 6 relate to equipment for the implementation of the method. This equipment enables the use of changes in frequencies and/or spreading codes during the transmission of a packet. Since the originality of the method resides not in the well-known fact of making the segments orthogonal but in particular, as has been seen further above, in the transmission of packets formed by sub-packets all having one and the same structure, the transmitters according to FIG. 5 and the receivers according to FIG. 6 are very close to known transmitters and receivers from which they are distinguished above all in terms of their working protocols as described here above. In fact, with the protocols being known, the making of a transmitter and a receiver capable of applying them raises no problems for those skilled in the art who, on the contrary, will find a certain facility therein. It is therefore possible hereinafter to eliminate all that comes under current technology and that does not contribute to understanding the examples of implementation of the method. The drawings are clearer and the explanation will be thereby simplified.

FIG. 5 is an electrical diagram pertaining to a transmitter for the implementation of the method. First of all, this diagram shall be commented upon in the case where the transmitter works in frequency hopping mode and with spreading codes. Then, an indication shall be given of the way in which the description must be modified for an example where the transmitter works in frequency gradient mode.

The data bits to be transmitted, D, are given to a packet formation circuit 1 which, as a function of the bits that it receives, delivers packets to a control circuit 2. The role of the circuit 2 is to introduce information elements into the packet. These information elements, as needed, may be for example the address of the sender or the address of the addressee or addressees. Its role is also to organize the operations of subdividing the packets into sub-packets, the spreading of the sub-packets by spreading codes and by frequency hops. A time base circuit 3 delivers the synchronization signals needed for these spreading operations. The circuit 3 is activated by a signal Sa given by the circuit 2 whenever it is desired to start the operations of spreading a sub-packet.

To organize the spreading operations, the control circuit 2 has the list of the frequencies and codes to be used as well as the laws of application of these frequencies and these codes. In other words, it memorizes the characteristics of the standard sub-packet referred to here above. It may thus organize the operations so that, as seen further above, the spread characteristics of the sub-packets that will be transmitted correspond to those of the standard sub-packets.

From the time base circuit 3, the control circuit 2 receives pulses Sb for the synchronization of the bits and pulses Ss for the synchronization of the starting points of segments. It may thus provide groups of bits B, each corresponding to the bits of a segment to be transmitted and, with each group, a signal C and a signal F respectively representing the spreading code and the frequency to be used for the transmission of the group considered.

A modulation and encoding circuit 4 receives the signals B, C and the synchronization signals Sb, Ss. It gives a modulated signal formed by segments to which there are applied the encoding operations determined by the control circuit 2. After filtering in a filter 5, these segments, to which orthogonal spreading codes are applied, reach the first input of a mixer 9 which, at a second input, receives a signal at a carrier frequency whose value is determined, for each segment, by the signal F corresponding to the segment considered. The carrier frequency signal that reaches the second input of the mixer 9 is prepared by a variable synthesizer 8 which receives a signal at fixed frequency given by a pilot circuit 6 and a signal for the control of its output frequency, constituted by a voltage given by a voltage generator 7. To give this voltage, the generator 7 which is synchronized by the signals Ss for the synchronization of the starting points of the segments receives the signal F whose value indicates the voltage to be delivered by the generator 7 and hence the frequency to be delivered by the synthesizer 8.

The mixer 9, depending on the signals that it receives at its two inputs, delivers a header and sub-packets formed by segments encoded according to mutually orthogonal encoding operations at its output. These segments are, for one and the same sub-packet, all at different frequencies. Furthermore, the header and the sub-packets of one and the same packet are synchronized and the sub-packets are transmitted at constant frequency.

An output circuit 10 comprising a wideband filter at input and a power amplifier at output receives the signal prepared by the mixer 9 and gives an antenna Ae the packets formed by a header followed by sub-packets formed by a sequence of segments with frequency hopping between the segments and orthogonal encoding between all the segments of one and the same sub-packet.

To receive such a packet, a receiver according to FIG. 6 is proposed. This receiver has a reception antenna Ar connected to an input circuit 11 comprising a preamplifier and a wideband filter that are series-connected. The circuit 11 is connected to the first input of a mixer 12 which receives, at a second input, the output signal of a variable synthesizer 14. This synthesizer receives a signal at fixed frequency from a pilot circuit 13. The signal at intermediate frequency delivered by the mixer 12 is shaped in a shaping circuit 15 that has a filter followed by an amplifier with automatic gain control.

By means of the synthesizer 14 whose operation shall be seen further below, the mixer 12 gives a signal at constant intermediate frequency modulated by the information elements contained in the packets transmitted by the transmitter according to FIG. 5. After passing into the circuit 15, this signal is applied to the input of the correlators 16, 18. The correlator 16 is an asynchronous correlator which has the role of making a search, in its input signal, for the headers which, it has been seen, constitute fields of synchronization all having the same composition whatever may be the packet.

When a header is found by the correlator 16, a packet starting signal Sd is delivered by the correlator 16 to a time base circuit 17 that gives a synchronization signal Sc to the synchronous correlator 18. The frequency of the signal Sc, when this signal is triggered by the signal Sd, corresponds to the theoretical value of the intermediate frequency. The correlator 18 is connected to the input of a demodulation circuit 19 which is itself connected to the input of a control circuit 20 and the circuit 20 has an output connected to a spreading code control input of the synchronous correlator 18. The circuits 18, 19, 20 therefore form a loop.

The control circuit 20 is the counterpart of the control circuit 2 of the transmitter of FIG. 5. Its main role is to organize the operations of compression of the packets received. For this purpose, it has available the list of frequencies and codes used as well as the laws of application of these frequencies and of these codes, namely the relationship of spreading of the standard sub-packet and the frequency of transmission of the sub-packet. When the asynchronous correlator 16 finds a header, it activates the synchronous correlator 18. The correlator 18, having been set initially to carry out a compression corresponding to the spreading code applied to the part of the packet that immediately follows the header, can then immediately give a signal formed by compressed bits. The demodulation circuit 18 receives this signal and demodulates it to give it to the control circuit 20. This control circuit 20, having knowledge of the structure of the standard sub-packet, can, as and when the bits arrive, determine that sub-packet and that segment of the sub-packet considered to which a bit belongs and hence the corresponding code and frequency of spreading. Thus, the circuit 20 may control the synchronous correlator 18 so that the compression code used at a given moment in this correlator responds to the spreading code of the signal at its input connected to the output of the circuit 15.

The control circuit 20 can thus give compressed packets to a packet processing circuit 22 and this circuit 22 delivers the information elements contained in the packets to the user or users to which they are addressed.

The demodulation circuit 19 is connected to an input of the time base circuit 17 to synchronize the circuit 17 with the bits obtained by demodulation in the circuit 19.

The control circuit 20 may also have the role of reading, in the packet, information elements such as the address of the sender or of the addressee of the packet so that, for example, it stops a packet that is not intended for the receiver from being taken into account. But above all, the control circuit 20 plays a major role that has not yet been referred to, pertaining to the control of the variable synthesizer 14. Indeed, as and when it identifies a start of a segment, it gives the time base circuit 17 a pulse relating to the start of a segment so that this circuit 17 can prepare a signal Si for synchronizing the start of a segment. The signal Si is sent to an enabling input of a voltage generator 21 whose output gives a voltage for controlling the frequency of the variable synthesizer 14. The value of this control voltage is a function of the value of a signal Sf given to the generator 21 by the control circuit 20. The value of Sf is modified to the circuit 20 as and when the segments appear. For this purpose, the circuit 20 makes a choice, from its list of frequencies, of the frequency that corresponds to the segment received at a given point in time. Thus controlled, the variable synthesizer 14 enables the mixer 12 to carry out the frequency compression and hence give the signal at constant intermediate frequency applied to the input of the shaping circuit 15.

The implementation of the method by frequency gradient as shown in the graph of FIG. 3 and with spreading codes leads to a transmitter diagram which is also that of FIG. 5. However, the voltage generator 7 is activated to deliver a voltage ramp and the signal C, given by the circuit 2 for the control of the encoding operations, is modified when the ramp goes through certain predetermined values known to the control circuit 2. And when the method is implemented with a frequency ramp but without spreading codes, in the diagram of the transmitter, the link that gives the signal C is eliminated.

Similarly, the implementation of the method in reception with frequency gradient and spreading codes leads to a diagram which is that of FIG. 6. However, the voltage generator 21 is activated to deliver a voltage gradient and the signal given by the circuit 20 to the correlator 22 is modified when the gradient passes through the predetermined values known to the control circuit 20. And when the method is implemented with a frequency gradient but without spreading codes, in the diagram according to FIG. 6 the synchronous correlator is eliminated and the output signal of the shaping circuit 15 is applied, firstly to the asynchronous correlator 16 and, secondly, directly to the demodulation circuit 19.

The invention is not limited to the examples described and relates, for example, to the case in which the standard sub-packet has characteristics that vary with time, either in a predetermined way or after the exchange of information between the stations of the communications network.

What is claimed is:

1. A method for communicating data in packers between several transmitters and at least one receiver, comprising the steps of:

forming a packet, which is one of said packets, at one of said several transmitters, comprising, forming a header, forming n sub-packets, each having a same structure as a predetermined standard sub-packet having mutually orthogonal segments, where n is a real number greater than 1 and is a function of said packet, but may be different for other packets, said forming step comprising spreading a data element among the n sub-packets;

transmitting said packet from said one of several transmitters, comprising transmitting said header at a predetermined frequency, transmitting said n sub-packets so as to synchronously follow said header and transmitting respective of said n sub-packets with a periodicity such that a duration between adjacent of said sub-packets is in an inclusive range of a duration of said standard sub-packet and a packet duration; and receiving said packet at said at least one receiver, comprising, retaining in memory a structure of said standard sub-packet, identifying the transmission of the packet by only monitoring the reception of the header, receiving the header, identifying a presence of said sub-packets as being received after said step of receiving the header, and processing the sub-packets by comparing the standard sub-packet retained in memory with the sub-packets and despreading the data elements from the sub-packets.

2. The method of claim 1, wherein said step of forming the n sub-packets comprises forming the n sub-packets to have respective durations that equal a duration of said header.

3. The method of claim 1, wherein:

said step of forming the n sub-packets comprises forming the n sub-packets with segments reduced to one bit; and said step of transmitting said n sub-packets comprises transmitting the segments in at least one frequency ramp.

4. A transmitter for transmitting data in packets in a system having several transmitters and at least one receiver, comprising:

means for forming a packet, which is one of said packets, comprising, means for forming a header, means for forming n sub-packets, each having a same structure as a predetermined standard sub-packet having mutually orthogonal segments, where n is a real number greater than 1 and is a function of said packet, but may be different for other packets, means for spreading a data element among the n sub-packets, mean for transmitting said packet, comprising means for transmitting said header at a predetermined frequency, and means for transmitting said n sub-packets so as to synchronously follow said header and transmit respective of said n sub-packets with a periodicity such that a duration between adjacent of said n sub-packets is in an inclusive range of a duration of said standard sub-packet and a packet duration, wherein a receiver that retains in a memory a structure of said standard sub-packet will be able to receive said packet transmitted by said transmitter by steps of, identifying the transmission of the packet by only monitoring the reception of the header, receiving the header, identifying a presence of said sub-packets as being received after said step of receiving the header, and processing the sub-packets by comparing standard sub-packet retained in memory with the sub-packets and despreading the data elements from the sub-packets.

5. A receiver for receiving and compressing data in a packet transmitted by a transmitter in a system having several transmitters and the receiver, comprising:

a memory configured to hold a structure of a standard sub-packet having mutually orthogonal segments and a predetermined duration;

means for receiving the packet by monitoring only a header in said packet, said header being transmitted at a predetermined frequency from said transmitter;

means for identifying the transmission of n sub-packet which follow in synchronism after said header, where respective of said n sub-packets were transmitted by said transmitter with a periodicity such that a duration between adjacent of said n sub-packets is in an inclusive range of said duration of said standard sub-packet and a packet duration, where each of said sub-packets have a same structure as the standard sub-packet, where n is a real number greater than 1 and is a function of said packet, but may be different for other packets;

means for processing the sub-packets by comparing the standard sub-packet retained in memory with the sub-packets; and means for despreading the data elements from the sub-packets using said standard sub-packet.

* * * * *